United States Patent
Schillegger et al.

(10) Patent No.: US 6,174,062 B1
(45) Date of Patent: *Jan. 16, 2001

(54) ADJUSTABLE REAR-VIEW MIRROR FOR A VEHICLE

(75) Inventors: Peter Schillegger, Nestlebach; Gerald Fink, St. Ruprecht/Raab; Wolfgang Pacher, Gleisdorf, all of (AT)

(73) Assignee: Magna Auteca Zweigniederlassung der Magna Holding AG, Weiz (AT)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/142,563

(22) PCT Filed: Jan. 7, 1998

(86) PCT No.: PCT/EP98/00031

§ 371 Date: Sep. 11, 1998

§ 102(e) Date: Sep. 11, 1998

(87) PCT Pub. No.: WO98/31565

PCT Pub. Date: Jul. 23, 1998

(30) Foreign Application Priority Data

Jan. 17, 1997 (AT) .................................................... A67/97

(51) Int. Cl.[7] .............................. G02B 7/182; G02B 5/08
(52) U.S. Cl. .......................... 359/872; 359/871; 359/873; 359/874; 248/475.1; 248/476; 248/477
(58) Field of Search ............................... 359/872, 871, 359/873, 874, 877; 248/475.1, 476, 477, 482

(56) References Cited

U.S. PATENT DOCUMENTS

| 3,628,862 | 12/1971 | Stephenson | 248/485 |
|---|---|---|---|
| 4,101,206 | 7/1978 | Oskam et al. | 74/501 M |
| 4,116,538 | 9/1978 | Oskam | 359/872 |
| 4,957,359 | * 9/1990 | Kruse et al. | 248/481 |
| 4,981,279 | * 1/1991 | Andreas et al. | 248/483 |
| 4,988,179 | * 1/1991 | Stensland | 359/872 |
| 5,042,932 | * 8/1991 | Pent | 359/874 |
| 5,467,230 | 11/1995 | Boddy et al. | 359/874 |

FOREIGN PATENT DOCUMENTS

| 256645 | 8/1967 | (AT) . |
|---|---|---|
| 1241295 | 5/1967 | (DE) . |
| 3633010 | 4/1987 | (DE) . |

(List continued on next page.)

OTHER PUBLICATIONS

English Language Abstract of JP No. 59–167346, vol. 9 , No. 22 (M–354) Jan. 30, 1985.

* cited by examiner

Primary Examiner—Mohammad Y. Sikder
(74) Attorney, Agent, or Firm—Greenblum & Bernstein, P.L.C.

(57) ABSTRACT

In an adjustable rearview mirror, especially an outside mirror, for a motor vehicle, whereby a first element (1) is affixable to the vehicle and a second element (2), rotatably attached to the first element (1), has or forms a mount for a mirror (4), whereby the two elements (1, 2) are designed as dish-shaped elements (1, 2) that nest with one another at least partially and are guided or bear against one another via outside and inside areas of contact forming a segment of a spherical surface and whereby a drive (6) is provided between the first and the second element (1, 2) is proposed, characterized in that the outer element (2) is designed on part of its inner surface with a gear-tooth system extending along a circular section of the inner surface of the outer element (2), with which a pinion (8) of a drive (6) mounted in the inside of the inner element (1) meshes for adjustment of the outer element (2) relative to the inner element (1), by which means can be achieved with a simple construction a design that is largely insensitive to vibrations.

12 Claims, 4 Drawing Sheets

FOREIGN PATENT DOCUMENTS

| | | |
|---|---|---|
| 3629320 | 2/1988 | (DE) . |
| 3820578 | 2/1989 | (DE) . |
| 3914334 | 10/1990 | (DE) . |
| 4030010 | 4/1991 | (DE) . |
| 4115876 | 11/1991 | (DE) . |
| 0460666 | 12/1991 | (EP) . |
| 0287181 | 7/1992 | (EP) . |
| 0675817 | 10/1995 | (EP) . |
| 2347231 | 11/1977 | (FR) . |
| 2649653 | 1/1991 | (FR) . |
| 59-167346 | 9/1984 | (JP) . |
| 95/05295 | 2/1995 | (WO) . |

ADJUSTABLE REAR-VIEW MIRROR FOR A VEHICLE

CROSS-REFERENCE TO RELATED APPLICATIONS

The present application is a U.S. National Stage application of International Application No. PCT/EP98/00031 filed Jan. 7, 1998, and claims priority under 35 U.S.C.§ 119 of Austrian Patent Application No. A67/97, filed on Jan. 17, 1997.

BACKGROUND OF THE INVENTION

1. Field of the Invention

The present invention concerns an adjustable rearview mirror, especially an outside mirror, for a motor vehicle, whereby a first element is affixable to the vehicle and a second element, rotatably attached to the first element, exhibits or forms a mount for a mirror, whereby the two elements are designed as dish-shaped elements that nest with one another at least partially and are guided or bear against one another via outside and inside areas of contact forming a segment of a spherical surface and whereby a drive is provided between the first and the second element.

2. Discussion of Background Information

From AT-B 256 645 and DE-B 12 41 295, a motor vehicle outside rearview mirror combined with an electric lamp has become known, whereby two dish-shaped elements that nest partially with one another are provided and a lamp is to be integrated in the mirror, whereby no drive is provided between the individual dish-shaped elements, however.

Adjustable rearview mirrors of the type initially mentioned can be found in DE-A 39 14 334 and FR-A 2 649 653, whereby hemispherical friction dishes guided on one another are each designed with a drive for mutual adjustability of the friction dishes. Provided for the adjustment or as a drive in these known designs are rack-and-pinion gears, costly in terms of design, which make necessary a multitude of additional components and a large space requirement.

In addition, from DE-C 36 29 320 has become known a remotely controllable rearview mirror for a motor vehicle with an actuating device and a twistable bearing device for the rearview mirror, whereby the two devices are connected to one another via Bowden cables. The actuating mechanism of this known device consists here of two worm gears that are drivable by two knurling wheels and are connected with the cables of at least two Bowden cables for the adjustment of the bearing device in two directions in space.

Inferable in DE-A 38 20 578 is an outside mirror for motor vehicles comprising an outer housing that exhibits a reflecting plate and a device with a drive and an electric motor which produces a rotating motion of the housing around a fixed axis. Here, by means of a control switch system, the rearview mirror is swiveled into its operating position at a movement of the vehicle, while the rearview mirror is swiveled into a position folded up against the vehicle at stillstand of the vehicle's engine.

Additional known designs of adjustable mirrors for motor vehicles of the type initially mentioned can be found, for example, in EP-B 0 287 181, EP-B 0 675 817, DE-A 36 33 010, DE-A 40 30 010, and DE-A 41 15 876. In each of these known designs, a carrier element is provided that is affixable to the vehicle, whereby a second element holding a mirror is rotatably hinge-jointed to a free end of this carrier element, whereby a swivel joint, usually extremely complex in design, is provided for a swivelling of the mirror element relative to the carrier element. In addition, at least one gear box or a drive motor for facilitation of mutual swiveling capability is provided in the region of this swivel joint. Disadvantageous in these known design forms is in general that an essentially point support is provided to the elements capable of swiveling relative to one another, which is relatively unstable especially with respect to shocks and vibrations. Additionally disadvantageous is that essentially the entire swiveling mechanism, and thus the largest part of the weight of the device is concentrated in a very small space in the region of the swivel point.

SUMMARY OF THE INVENTION

The present invention, starting with a rearview mirror of the type initially mentioned, has the object of creating a rearview mirror that, with a simple construction, permits a reduction in vibrations and thus a simple and stable mounting overall. For the solution of this task, the rearview mirror in accordance with the invention is essentially characterized in that the outer element is designed on part of its inner surface with a gear-tooth system extending along a circular section of the inner surface of the outer element, with which a pinion of a drive mounted in the inside of the inner element meshes for adjustment of the outer element relative to the inner element. The design in accordance with the invention permits an especially simple design of the particularly automatic or motor-driven swiveling of the elements of the rearview mirror in accordance with the invention relative to one another. In similar fashion, the pinion that meshes with a gear-tooth system on the inner surface of the outer element can be arranged at a great distance from the swivel point, so that a concentration of the weight of the components in the region of the swivel center point, as was the case in designs in accordance with the state of the art and leads to large vibrations, can be avoided. Since two dish-shaped elements are provided in the rearview mirror in accordance with the invention, which are supported against one another via segments of a of a spherical surface, it is possible to make available in a simple manner a large area for mutual mounting and support of the dish-shaped elements of the rearview mirror in accordance with the invention, so that overall a stable construction is achievable with a simple construction even with the use of lightweight materials and a small number of components. Moreover the actuating and drive devices required for movement of the two dish-shaped elements with respect to one another can be arranged in a relatively large space in the interior of the inner dish-shaped element at a large distance from the actual swivel center point while optimizing the weight distribution of the complete rearview mirror, through which means the vibration characteristics of the rearview mirror in accordance with the invention are likewise improved.

For an implementation of especially structurally simple construction in which all elements of the drive are essentially accommodated in the interior of the inner, dish-shaped element, it is provided in accordance with an additional preferred embodiment that the pinion of the drive mounted in the interior of the inner element projects through a recess of the inner element.

In order to permit a swiveling of the mirror in all directions in simple fashion, it is moreover provided in accordance with an additional preferred embodiment that two drive motors designed with pinions, with a reducing gear interposed if necessary, are mounted in the interior of the inner element, whose pinions meshing with the inner surface of the outer element together enclose an essentially right angle and that the gear-tooth systems on the inner surface of the outer element meshing with the pinions each extend over an angular range corresponding to a swivel angle associated with the other pinion of the outer relative to the inner element. Through provision of reducing gears, simple and small motors can be used, whereby mutual arrangement of the drive pinions at a right angle to one another also permits the mirror to achieve all spatial positions. Since with adjustment of one pinion, the other pinion must follow the gear-tooth system on the inner surface of the outer dish-shaped element, it is further provided in accordance with the invention that the gear-tooth systems each extend in an arc over a corresponding angular region on the surface of the outer element of the rearview mirror in accordance with the invention.

For automatic correction or tracking of a pinion for the achievement of a desired positioning of the rearview mirror in accordance with the invention upon adjustment of the respective other pinion it is further preferably suggested that the movement of the pinions or the drive motors be coupled together or coordinated with one another.

For the achievement of an accordingly large adjustment range or swivel range of the rearview mirror in accordance with the invention, it is further preferably suggested that the swivel capability of the dish-shaped elements relative to one another starting from a central position amount to a maximum of ±25°, especially ±15°.

For an additional improvement of the mutual support and positioning of the dish-shaped elements of the rearview mirror in accordance with the invention, it is further preferably suggested that the two dish-shaped elements in the region of the center point of the spherical surfaces be additionally supported against one another via a spherical bearing or a universal joint and that the inner element be designed with one edge running obliquely outward starting from the spherical bearing in the center, whose angle of inclination relative to a diameter of the spherical surface corresponds to at least the maximum swivel angle of the dish-shaped elements relative to one another. In addition to the areal support of the dish-shaped elements with one another via the spherical areas of contact, such a spherical bearing or a universal joint defines an exact swivel point of the elements movable relative to one another and thus increases the mutual bearing stability. In order to avoid a collision between the two dish-shaped elements during swiveling of the same, it is further provided in accordance with the invention that the inner element be designed with one edge running obliquely outward starting from the spherical bearing in the center, whose angle of inclination relative to a diameter of the spherical surface corresponds to at least the maximum swivel angle of the dish-shaped elements relative to one another.

For a further increase in the internal stability of the overall design of the rearview mirror in accordance with the invention and for avoidance of mutual displacements between the individual elements, it is further preferably provided that a connection with the outer dish on the side away from the bearing be provided starting from the spherical bearing or the universal joint in a manner known per se.

For an especially protected installation of the inner dish-shaped element of the rearview mirror in accordance with the invention, which additionally accommodates the entire swivel mechanism, it is further preferably suggested in accordance with the invention that the outer element fully enclose the inner element and that at least one connection extension for attachment of the inner element to the vehicle be passed through a recess in the outer element.

For additional optimization of weight, it is further preferably suggested that the axes of the drive pinion(s) in the region of the outside edge of the rearview mirror be (are) arranged in the interior of the inner element, which results in the largest possible distance from the swivel point so that the drive can be driven with a particularly low expenditure of force.

For a particularly simple arrangement of the rearview mirror in accordance with the invention, it is provided in accordance with a preferred embodiment that the inner dish-shaped element is attachable to the vehicle in a manner known per se and that the outer dish-shaped element projects beyond the inner element at least on the side facing away from the attachment of the inner element to the vehicle and forms or exhibits a mount for a mirror. Thus the inner dish-shaped element can be designed simply with an appropriate extension or a mount for attachment to the vehicle, whereby appropriate design changes and adaptations are also possible without impairing the swivel capability of the elements of the rearview mirror. Furthermore, the outer dish-shaped element, when appropriately shaped, can also be designed as a mount for a mirror or can be provided with such a mount.

BRIEF DESCRIPTION OF THE DRAWINGS

The invention is explained in further detail below with the aid of the example embodiments of the rearview mirror in accordance with the invention schematically represented in the attached drawing. Shown in these are:

FIG. 1 is cross-section along the line I—I of FIG. 2;

DETAILED DESCRIPTION OF THE PRESENT INVENTION

Figure 1:
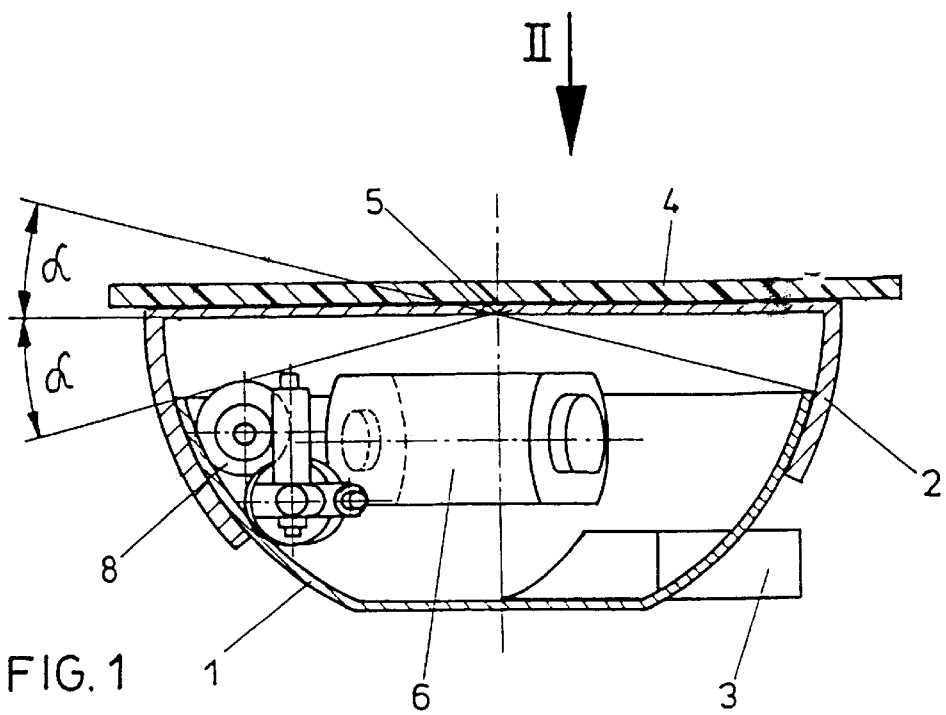
FIG. 1 a cross-section through a first embodiment of a rearview mirror in accordance with the invention.
Figure 2:
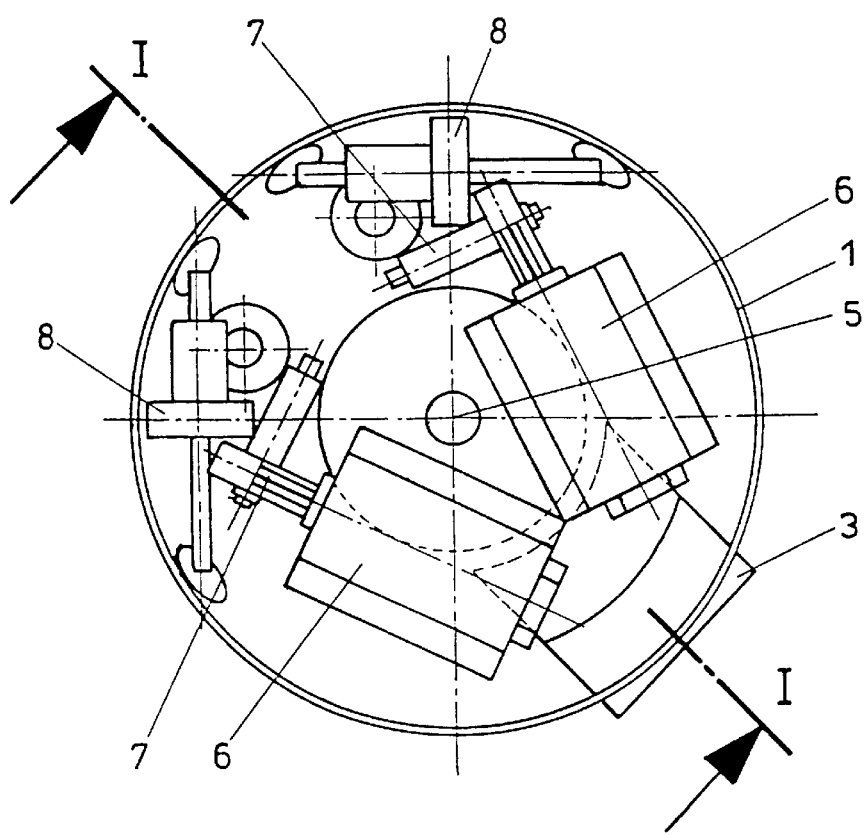
FIG. 2 a view in the direction of the arrow II of FIG. 1, whereby

In the illustration in accordance with FIGS. 1 and 2, an inner dish-shaped element of a rearview mirror is designated 1 and is partially overlapped by an outer dish-shaped element 2, as can be clearly seen from FIG. 1. The outer dish-shaped element 2 projects here beyond the inner element 1, which is designed with a mount schematically designated 3 for attachment of the entire mirror to a vehicle that is not illustrated in detail, and serves the attachment of a mirror schematically designated 4 on this side facing away from the mount 3.

As can be seen especially from FIG. 1, the dish-shaped elements 1 and 2 are each designed with areas of contact forming segments of a spherical surface, so that the overall result is a large supporting area between elements 1 and 2 at a great distance from the swivel center point designated with 5. For swiveling of the outer element 2 that bears the mirror 4, relative to the inner element 1 that is attached to the vehicle, two drive motors 6 are provided which, via a reducing gear each designated as 7 in the diagram, each drive a pinion 8 that projects through a recess of the inner element 1 and meshes with a corresponding gear-tooth system on the inner surface of the outer element 2, as will be illustrated in detail in the modified embodiment per FIG. 5.

The maximum swivel movement of the movable outer element 2 relative to the inner element 1 is indicated schematically in FIG. 1 through the angle a and for example amounts to approximately ±15.

Figure 3:
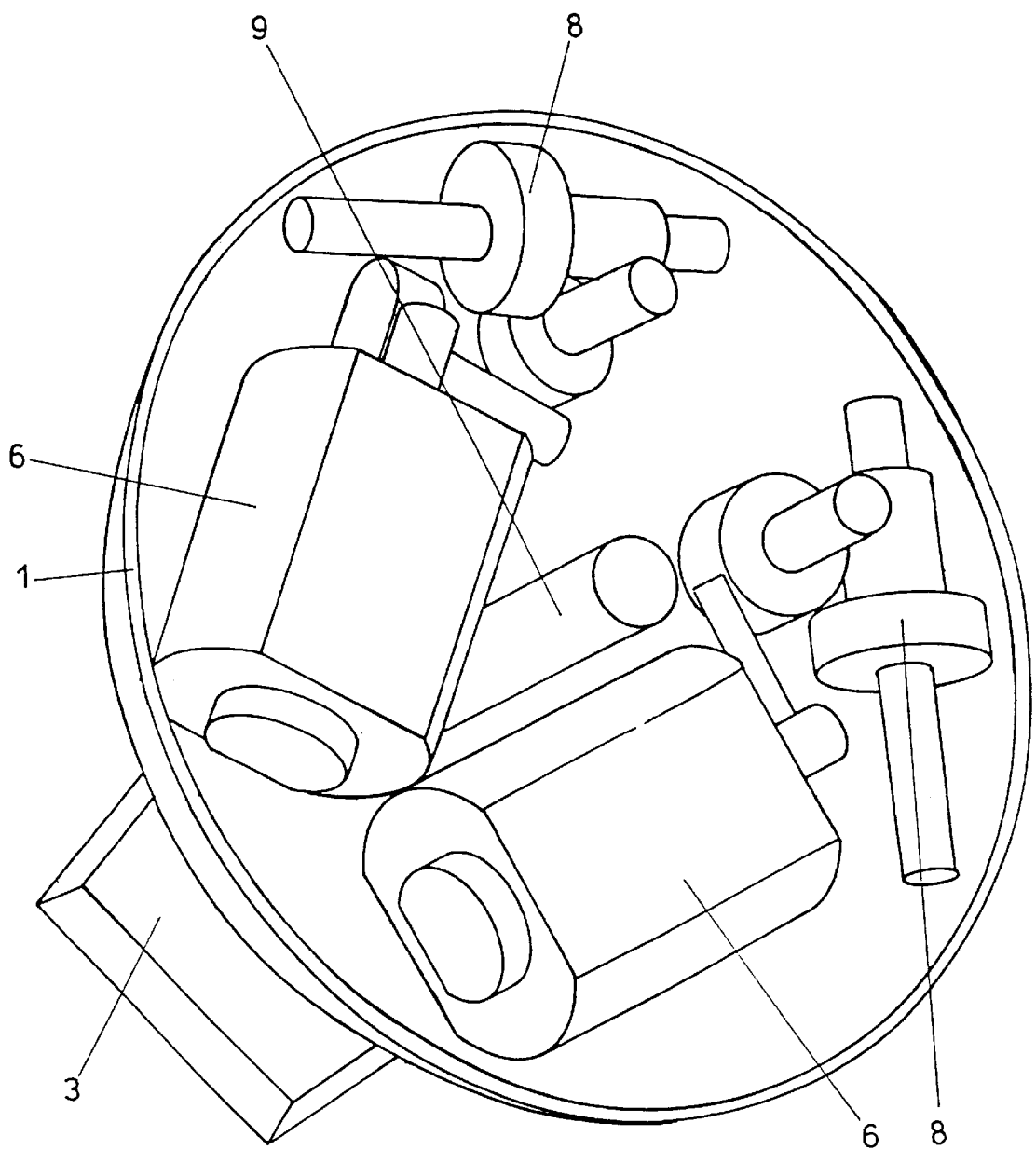
FIG. 3 an isometric spatial view in the interior of the inner dish-shaped element of the rearview mirror in accordance with the invention corresponding to the embodiment per FIG. 2.
Figure 4:
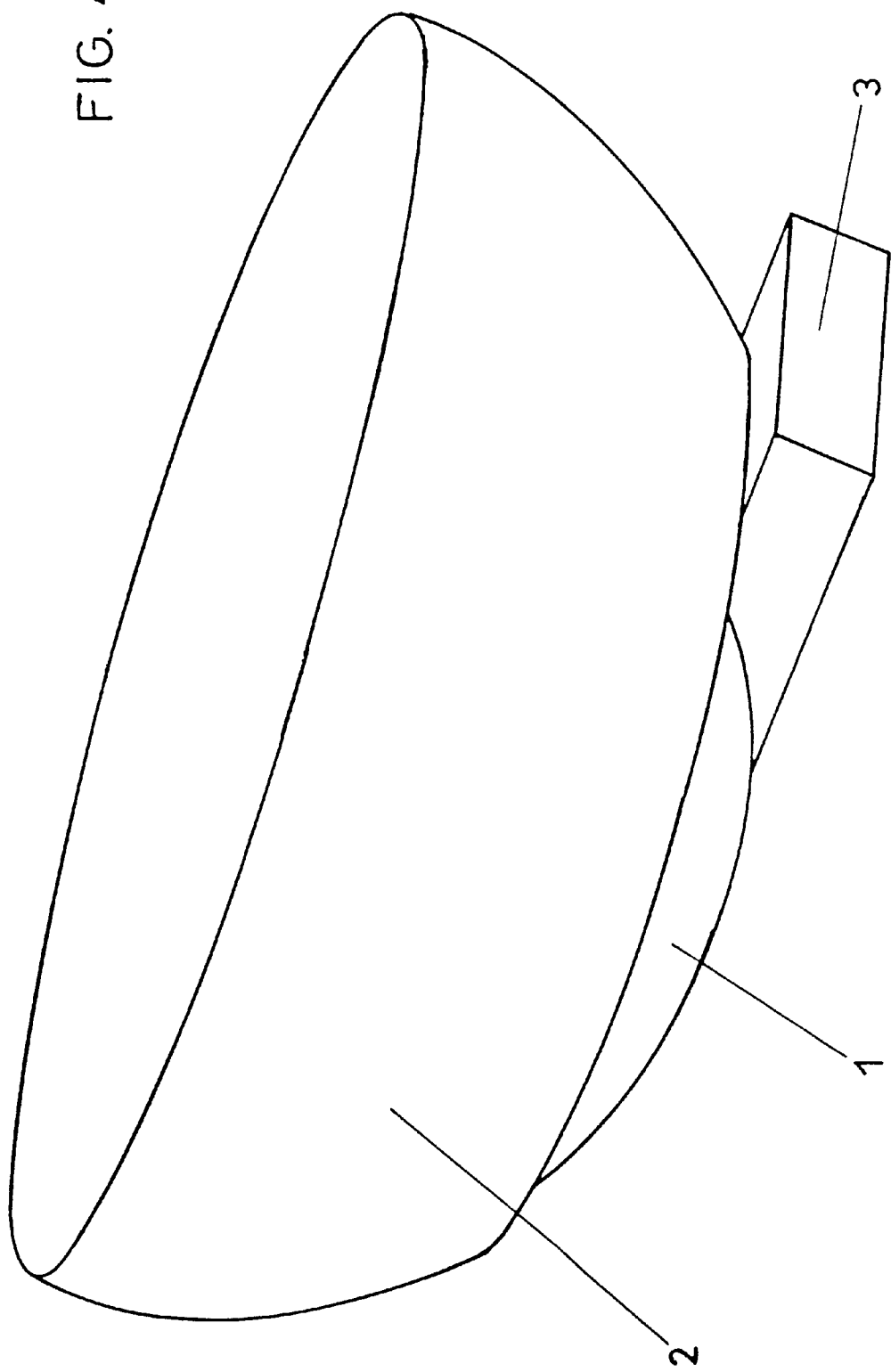
FIG. 4 an isometric view of the rearview mirror of the embodiment per FIGS. 1 through 3.

In the isometric spatial view per the FIGS. 3 and 4, the relative spatial arrangement of the individual components of the swivel mechanism in the interior of the inner dish-shaped element 1 is sketched. Again in FIG. 3, the positioning of the motors 6, the reducing gear 7 and the pinion 8 can be seen. In addition, a connecting rod 9 is sketched in the center which serves in turn for additional attachment of the outer bowl-shaped element 2 that is not illustrated in FIG. 3, as is also shown in greater detail in FIG. 5.

Figure 5:
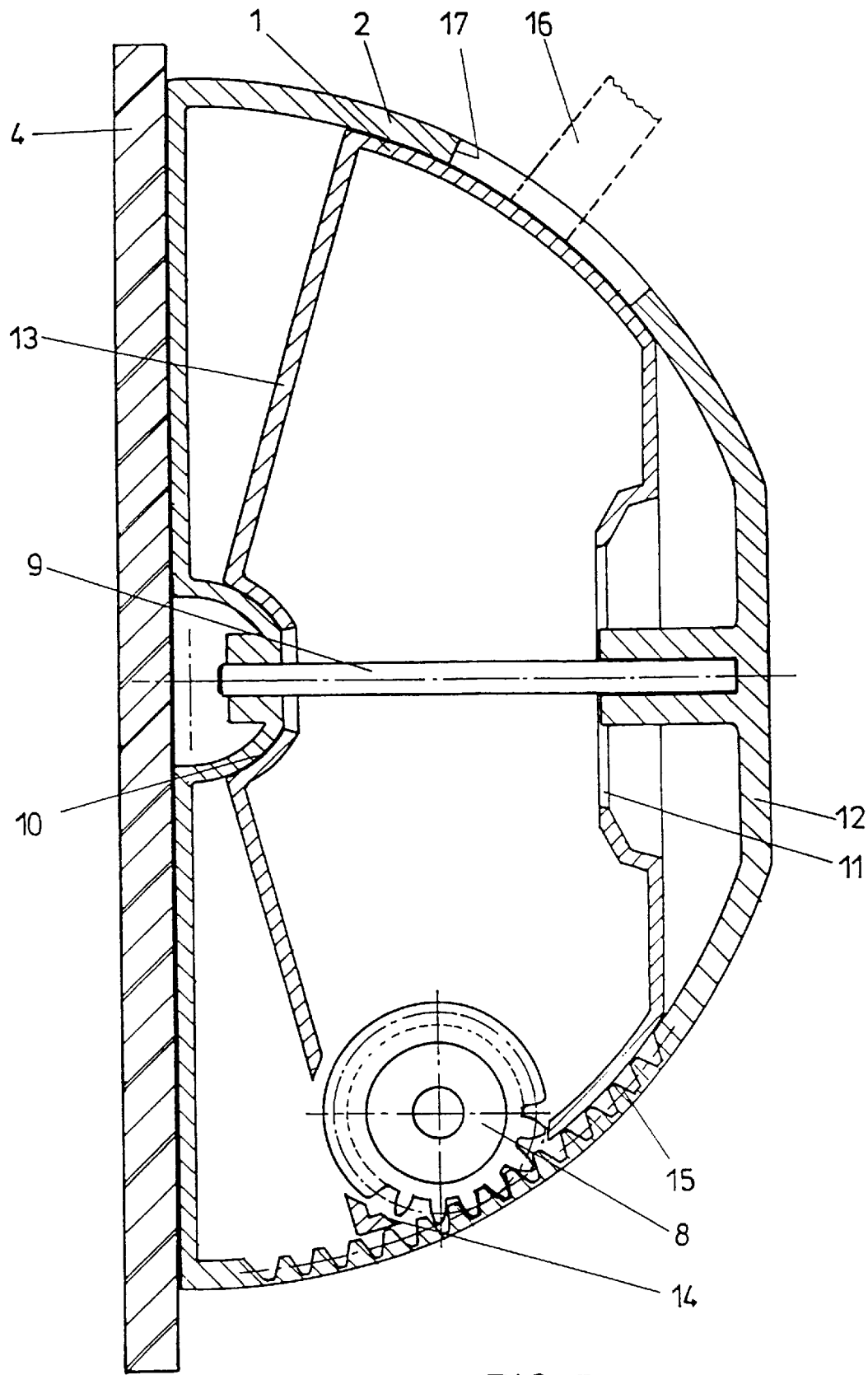
FIG. 5 a cross-section through a further modified embodiment of a rearview mirror in accordance with the invention in an enlarged scale as compared to FIG. 1.

In the modified embodiment of a rearview mirror illustrated in FIG. 5, the outer dish-shaped element 2 fully encloses the inner dish-shaped element 1 so that the full area of contact forming a segment of a spherical surface of the inner element 1 is available for the mutual support and mounting of the dish-shaped elements 1 and 2 relative to one another. Furthermore, a spherical bearing 10 is provided in the region of the swivel center point for improvement of the mutual support, whereby a central connecting rod 9 in turn extends from this spherical bearing 10 through an opening 11 on the back of the inner element 1 to the rear area of contact 12 of the outer element 2 and serves the fastening and stabilization thereof. Furthermore, it is provided that the inner element 1 is formed starting from the spherical bearing 10 in the center with an outer edge 13 running obliquely inward in order to avoid a collision between the elements 1 and 2 during the swiveling movement thereof. A mirror that is attachable on the outside of the outer element 2 is again indicated with 4

In FIG. 5 it is furthermore shown in detail how a pinion 8 projects through a recess 14 of the inner element 1 and meshes with a gear-tooth system 15 on the inner surface of the outer element 2 for swiveling of the dish-shaped elements 1 and 2 relative to one another. If swiveling of the elements 1 and 2 is only desired in one direction with provision of a pinion 8, the formation of the gear-tooth system 15 along a circular section of the inner surface of the outer dish-shaped element 2 is sufficient here.

Upon provision of two pinions 8 for the achievement of universal movability, as is shown for example in the embodiments of the preceding figures, the gear-tooth system 15 must also extend in planes extending normal to the plane of the illustration of FIG. 5 in order to make possible a carrying along of the other pinion 8 upon actuation of the one pinion 8. In order to achieve tracking or coordination of the movements of the pinions 8 for achievement of a desired swivel position of the mirror 4, an appropriate coupling or control of the drive motors of the pinions 8 can additionally be provided.

Attachment of the inner element 1 to the vehicle is accomplished here via schematically sketched extensions 16, which pass through recesses 17 in the outer element 2.

What is claimed:

1. An adjustable rearview mirror for a vehicle, comprising:
   a first inner element and a second outer element, each of said elements having an inner surface and outer surface, wherein said first inner element is affixable to a mount of the vehicle and said second outer element, rotatably attached to the first inner element;
   the two elements are dish-shaped elements that nest with one another at least partially and are guided against one another via outside and inside areas of contact forming a segment of a spherical surface;
   a drive is provided between the first and the second element; and
   said outer element on part of said inner surface has a gear-tooth system extending along a circular section of said inner surface of the outer element, with which a pinion of said drive mounted in said inner surface of the first inner element meshes for adjustment of said second outer element relative to said first inner element.

2. The adjustable rearview mirror according to claim 1, wherein said pinion of said drive mounted in said inner surface of said first inner element projects through a recess of the first inner element.

3. The adjustable rearview mirror according to claim 1, said adjustable rearview mirror comprising two drive motors having pinions, with a reducing gear mounted in said inner surface of said first element, wherein said pinions meshing with said inner surface of said second outer element are arranged to enclose an essentially right angle, and
   the gear-tooth systems on said inner surface of said outer element meshing with each pinion over an angular range corresponding to a swivel angle associated with the other of said each pinion of said second outer element relative to said first inner element.

4. The adjustable rearview mirror according to claim 3, wherein movement of one of said pinions and said drive motors is coupled together.

5. The adjustable rearview mirror according to claim 1, swivel capability of said dish-shaped elements relative to one another starting from a central position amounts to a maximum of ±25°.

6. The adjustable rearview mirror according to claim 1, wherein said two dish-shaped elements in a region of a center point of spherical surfaces are additionally supported against one another via one of a spherical bearing and a universal joint; and
   said first inner element is designed with one edge running obliquely outward starting from said one of said the spherical bearing and said universal joint in the center, whose angle of inclination relative to a diameter of the spherical surface corresponds to at least the maximum swivel angle of the dish-shaped elements relative to one another.

7. The adjustable rearview mirror according to claim 6, wherein a connection with said second outer element on the side away from said one of said spherical bearing and said universal joint is provided starting from said one of said spherical bearing and said universal joint.

8. The adjustable rearview mirror according to claim 1, wherein said second outer element fully encloses the inner element; and
   at least one mounting extension for attachment of the inner element to the vehicle is passed through a recess in said second outer element.

9. The adjustable rearview mirror according to claim 1, wherein an axis of said drive pinion in a region of an outside edge of said rearview mirror is located in said inner surface of said first inner element.

10. The adjustable rearview mirror according to claim 1, wherein said first inner element is attachable to the vehicle; and said second outer element projects beyond said first inner element at least on a side facing away from an attachment of said first inner element to the vehicle and forms a mount for a mirror.

11. The adjustable rearview mirror according to claim 3, wherein movement of one of said pinions and said drive motors is coordinated with one another.

12. The adjustable rearview mirror according to claim 1, wherein swivel capability of said dish-shaped elements relative to one another starting from a central position amounts to ±15°.

* * * * *